United States Patent [19]

Shustack

[11] Patent Number: 5,744,514

[45] Date of Patent: Apr. 28, 1998

[54] COATED OPTICAL FIBERS HAVING A REDUCED CONTENT OF EXTRACTABLE AND VOLATILE MATERIAL

[75] Inventor: Paul J. Shustack, West Chester, Ohio

[73] Assignee: Borden Chemical, Inc., Columbus, Ohio

[21] Appl. No.: 740,664

[22] Filed: Oct. 31, 1996

[51] Int. Cl.$^6$ .................................. C08J 7/04; G02B 6/02
[52] U.S. Cl. .................................. 522/42; 522/44; 522/79; 522/90; 522/96; 385/123; 385/128; 385/145; 428/378; 428/392
[58] Field of Search .................................. 385/122–128, 385/141–145; 525/454; 522/90, 97, 96, 42, 44, 79; 428/425.6, 378, 392; 427/501, 513

[56] References Cited

U.S. PATENT DOCUMENTS

| | | | |
|---|---|---|---|
| 3,600,359 | 8/1971 | Miranda | 260/77.5 |
| 3,711,451 | 1/1973 | Caontos | 260/79 |
| 3,714,290 | 1/1973 | Kehr et al. | 260/858 |
| 3,729,404 | 4/1973 | Morgan | 204/159.15 |
| 3,891,327 | 6/1975 | Welch | 356/244 |
| 4,003,868 | 1/1977 | Smith et al. | 260/21 |
| 4,045,317 | 8/1977 | Larsen | 204/159.23 |
| 4,120,721 | 10/1978 | Ketley et al. | 96/36.3 |
| 4,221,646 | 9/1980 | Finelli et al. | 204/159.19 |
| 4,225,695 | 9/1980 | Schuster et al. | 528/75 |
| 4,629,285 | 12/1986 | Carter et al. | 350/96.23 |
| 4,642,353 | 2/1987 | Berger | 548/431 |
| 4,710,523 | 12/1987 | Lechtken et al. | 522/14 |
| 4,720,529 | 1/1988 | Kimura et al. | 525/454 |
| 4,844,578 | 7/1989 | Pierini et al. | 350/96.3 |
| 4,854,666 | 8/1989 | Kohara et al. | 385/128 |
| 4,985,472 | 1/1991 | Aosai et al. | 522/64 |
| 5,074,643 | 12/1991 | Petisce | 385/12 |
| 5,082,347 | 1/1992 | Akasaka et al. | 385/114 |
| 5,100,929 | 3/1992 | Jochum et al. | 522/64 |
| 5,146,529 | 9/1992 | Mizutani | 385/10 |
| 5,167,882 | 12/1992 | Jacobine et al. | 264/22 |
| 5,181,268 | 1/1993 | Chien | 385/128 |
| 5,208,281 | 5/1993 | Glaser | 524/189 |
| 5,236,967 | 8/1993 | Ohkawa et al. | 522/32 |
| 5,259,060 | 11/1993 | Edward et al. | 385/128 |
| 5,334,421 | 8/1994 | McNutt | 427/513 |
| 5,446,821 | 8/1995 | Nonaka et al. | 385/128 |
| 5,459,175 | 10/1995 | Woods et al. | 522/180 |
| 5,496,870 | 3/1996 | Chawla et al. | 522/90 |
| 5,527,835 | 6/1996 | Shustack | 522/42 |
| 5,538,791 | 7/1996 | Shustack | 428/392 |
| 5,587,403 | 12/1996 | Shustack | 522/42 |

*Primary Examiner*—Phan T. H. Palmer
*Attorney, Agent, or Firm*—Roylance, Abrams,Berdo & Goodman, L.L.P.

[57] ABSTRACT

Coated optical fibers with radiation-curable coatings which include mercaptofunctional oligomers are disclosed. Specifically, the coatings may comprise the cured reaction products of mercapto-terminated urethane oligomers of number average molecular weight as determined by gel permeation chromatography (GPC) of at least about 3,000 daltons, particularly in combination with one or more (meth) acrylate-terminated urethane oligomers; monomer diluents; and optional silane adhesion promoter, photoinitiator and stabilizers. The coatings, when cured, exhibit a percent extractables content, as obtained by Soxhlet extraction, of no more than about 15%, and preferably of no more than about 8%, and a volatiles content, as obtained by thermogravimetric analysis, of less than about 7%, and preferably less than about 3%. Processes for preparing such coated optical fibers and the coatings per se are also disclosed.

31 Claims, No Drawings

COATED OPTICAL FIBERS HAVING A REDUCED CONTENT OF EXTRACTABLE AND VOLATILE MATERIAL

BACKGROUND OF THE INVENTION:

The present invention relates to coated optical fibers whose radiation-curable coatings have a reduced content of extractable and volatile material.

Until recently, the optical fiber industry was concentrated on so-called "long haul" applications, wherein optical fibers were used to traverse long distances such as in transoceanic or transcontinental cables. In such applications, optical fibers required shielding with voluminous protective cabling material in sheltered subterranean or submarine environments and thus were not directly exposed to environmental hazards.

A recent trend in the optical fiber market is in local area networks for fiber-to-the-home uses. The fibers in such uses are directly exposed to much harsher conditions than previous applications of glass fibers, including severe temperature and humidity extremes. Consequently, previously used coatings did not perform well under such adverse conditions; hence, a need existed for the development of higher performance coatings. Such coatings need to be able to withstand the above conditions, i.e., to possess thermal, oxidative and hydrolytic stability, and to protect the fiber over the long term, i.e., over twenty-five years' time.

Optical fibers used for light transmission can be prepared which, immediately after drawing, are exceptionally strong and have very few intrinsic defects. However, such pristine fibers are very vulnerable and easily flawed by exposure to environmental conditions including dust and moisture. Even a small flaw can reduce the strength of a fiber by an order of magnitude, rendering it brittle and easily broken by weak external forces. Therefore, optical glass fibers have, in the prior art, been clad with at least one resin coat immediately after their preparation, whose minimum requirement is to protect the underlying pristine fiber from such external forces.

Typically, at least two coating layers, a primary, or buffer coating layer and a secondary coating layer, have been used. The inner, or primary, coating is applied directly to the glass fiber and, when cured, forms a soft, rubbery, compliant material which serves as a buffer to cushion and protect the fiber by relieving the stresses created when the fiber is bent, cabled or spooled. Such stress might otherwise induce microbending of the fibers and cause attenuation of the light traveling through them, resulting in inefficient signal transmission. The secondary coating is applied over the primary coating, and must function as a hard, tough protective outer layer, preventing damage to the glass fiber during processing and use.

Certain characteristics are desirable for the primary coating layer. For example, it must maintain adequate adhesion to the glass fiber during thermal and hydrolytic aging, yet be strippable therefrom for splicing purposes. The tensile modulus of the primary coating must be low to cushion and protect the fiber by readily relieving the stresses on the fiber which can induce microbending and consequent inefficient signal transmission. This cushioning effect must be maintained through the temperature range to which the fiber may be exposed throughout its lifetime: thus, it is necessary for the primary coating to have a low glass transition temperature (Tg). This low glass transition temperature will ensure that the coating remains in its rubbery state throughout the possible use temperature range.

The primary coating should also have a relatively high refractive index, i.e., greater than that of the cladding material of the fiber to be coated. This high refractive index allows for a refractive index differential between the glass cladding and the primary coating. This differential allows errant light signals to be refracted away from the glass core.

Another requisite quality of the primary (buffer) coating is resistance to moisture. Moisture will rapidly degrade the strength of the coating itself as well as the underlying glass fiber under stress. The reaction is one of hydrolysis and stress corrosion. Moisture will also adversely affect the adhesion of the primary (buffer) coating to the glass, resulting in possible delamination. It is therefore desirable for the coating to be as hydrophobic as possible. Preferably, the primary coating should have a water absorption value of less than 5% by weight, and more preferably less than 2.5% by weight. Moreover, it should be resistant to solvent swelling, i.e., it should swell less than about 40%, and, in some embodiments, less than about 10%, when soaked in gasoline for about 4 hours at room temperature.

Another important property of optical fiber coatings is that, when cured, they have a low content of unbound material. While ultraviolet curable materials are often referred to as 100% solids, they may still contain a significant amount of chemically unbound material after the ultraviolet cure. This unbound material can be extractable with solvent or water, or it can be volatile under certain conditions. The presence of an extractable or volatile component in optical fiber products can cause problems which may be detrimental to the fibers; such potential problems may manifest themselves throughout the lifetime of the optical fiber.

For instance, during production, chemically unbound materials may become volatized in the presence of the high heat encountered in the ultraviolet curing chamber of the fiber draw tower. This can create a smoke or fog inside the center tube of the tower which can decrease the transmission of ultraviolet light necessary for curing, resulting in incomplete cure of the optical fiber coating.

If there are chemically uncured and unbound materials present in the cured optical fiber coating materials, a potential exists for migration of these materials to other areas of the optical fiber structure during the lifetime of the fiber. For example, if the cured primary coating layer contains unbound material, it may migrate or exude over time, either to the glass coating interface, such that it may affect the coating adhesion characteristics, or in the direction of the secondary coating, such that it may enter it and potentially plasticize or soften it. Either event can affect fiber performance. Likewise, chemically unbound materials present in the secondary coating may migrate inward, deleteriously affecting the properties of the primary coating, or outward, affecting the adhesion of ink to the secondary coating. Similarly, if unbound materials are present in optical fiber inks or matrix material, they can potentially move about and cause, for example, harm to ribbon integrity or fiber breakout properties.

Another potential detriment of chemically unbound material relates to the physical properties of the remaining coating after the unbound material is removed. It is very likely that optical fiber products will be exposed to agents (for example heat, water, solvent or filling compounds) that are capable of volatilizing or extracting chemically unbound material at some point during the lifetime of the fibers. The coating may then undergo shrinkage or embrittlement, both of which may induce stress on the fiber and result in microbending and signal attenuation. Moreover, if the unbound materials are volatile, an odor problem during storage can occur.

Many potential sources of chemically unbound species which appear as extractable or volatile material in a cured ultraviolet curable coating layer, ink, adhesive or matrix material exist. Since most fiber optic formulations are urethane acrylate based, they may contain trace levels of unreacted polyol, nonacrylated urethane, alcohol, residual water, solvent, or other by-products of the reaction by which the acrylate materials are manufactured.

Other sources of unbound material include shelf stabilizers, photoinitiators, antioxidants, surface tension modifiers, release agents, and coefficient of friction (COF) modifiers. Any material present in the finished formulation that does not contain a chemically reacted group could potentially be extractable or volatile.

Other chemically unbound materials may result from incomplete photocure reaction, including unreacted monomer, oligomer, or other material that may be extractable or volatile. Also, it is possible for the raw materials to produce photo by-products or to polymerize only to a low molecular weight polymer which may be extractable with solvent. Also, a significant amount of the photoinitiator present in an ultraviolet curable formulation does not chemically react into the polymer network during cure, and thus is another source of chemically unbound material.

Moreover, an equilibrium amount of water will be present in all coatings exposed to the atmosphere. This water will also appear as a volatile material.

It has now been found that by using, in lieu of at least a portion of the acrylate-terminated oligomers which typically predominate in optical fiber coatings, a high molecular weight mercapto-terminated oligomer, the extractable and volatile material content of cured optical fiber coatings can be reduced significantly.

SUMMARY OF THE INVENTION

The invention is, thus, in one embodiment, a coated optical fiber including a primary coating layer which is formulated such that, when it is subjected to Soxhlet extraction, a percent extractable value of less than about 8% results and, when it is subjected to thermogravmetric analysis, a percent volatile value of less than 3% results. Stated differently, the invention is a coated optical fiber having a reduced content of extractable and volatile material, said coated optical fiber may comprise (a) an optical fiber; and (b) a primary coating layer comprising the radiation-cured reaction product of a composition comprising a mercapto-terminated urethane oligomer of number average molecular weight, as determined by GPC (gel permeation chromatography), as described below, of at least about 3,000 daltons, preferably at least about 6,000 daltons, and more preferably at least about 7,000 daltons.

In another embodiment, the invention may be a primary coating layer which comprises the radiation-cured reaction product of a composition comprising a high molecular weight mercapto-terminated urethane oligomer, e.g., a composition comprising the following ingredients (1) from about 5 to about 50 percent by weight of a mercapto-terminated urethane oligomer of number average molecular weight (as determined by GPC) of at least about 3,000 daltons;

(2) from about 10 to about 80 percent by weight of one or more acrylate- or methacrylate-terminated urethane oligomers;

(3) from about 10 to about 75 percent by weight of one or more monomer diluents;

(4) from about 0 to about 3 percent by weight of an organofunctional silane adhesion promoter which binds in with the primary coating composition during cure; and (5) from about 0 to about 10 percent by weight of a photoinitiator, all of said percentages being percentages by weight based on the weight of all ingredients.

In still another embodiment, the invention is a process for preparing a coated optical fiber comprising the following ingredients:

(1) applying to an optical glass fiber a primary coating composition layer comprising
  (i) from about 5 to about 50 percent by weight of a mercapto-terminated urethane oligomer of number average molecular weight (as determined by GPC) of at least about 3,000 daltons;
  (ii) from about 10 to about 80 percent by weight of one or more acrylate- or methacrylate-terminated urethane oligomers;
  (iii) from about 10 to about 75 percent by weight of one or more monomer diluents;
  (iv) from about 0 to about 3 percent by weight of an organofunctional silane adhesion promoter which binds in with the primary coating composition during cure; and
  (v) from about 0 to about 10 percent by weight of a photoinitiator,
all of said percentages being percentages by weight based on the weight of all ingredients, and (2) radiation-curing said coating in situ.

DESCRIPTION OF THE PREFERRED EMBODIMENTS

The invention relates to coated optical fibers which are coated with a particular radiation-cured primary coating layer composition. The fibers which are coated may, for example, comprise a glass core and a glass cladding layer. The core, for example, may comprise silica doped with oxides of germanium or phosphorus and the cladding, a pure or doped silicate such as fluorosilicate. Alternately, the fibers may comprise a polymer-clad silica glass core. Examples of such polymer claddings include organosiloxanes such as polydimethylsiloxane or a fluorinated acrylic polymer. The primary coating layer should have, inter alia, the following properties: moisture resistance; ease of coating and stripping; low volatiles content; low modulus over the life of the fiber (i.e., less than about 500 psi, so as to prevent signal attenuation from microbending); low glass transition temperature; and long shelf life. It should, when cured and subjected to solvent extraction as defined below, exhibit an extractable content of less than about 15%, preferably less than about 11% and more preferably no more than about 8%. Moreover, it should have a volatiles content, as determined by TGA (thermogravimetric analysis) as described below, of less than 7%, preferably less than 5%, and more preferably less than 3%. The secondary coating should form a hard protective layer; have a relatively high modulus and glass transition temperature; and also be moisture resistant. Both coatings should be transparent; nonmalodorous; fast curing; and remain adherent, even upon aging in high heat and humidity environments.

The following components make up the primary coating layer composition which, when cured, forms the primary coating layer of the invention.

(1) The Mercapto-Terminated Urethane Oligomer

The primary coating of the present invention includes the cured reaction product of a composition comprising a urethane oligomer which is mercapto-terminated, and preferably dimercapto-terminated, and has a number average molecular weight (Mn) of at least about 3,000 daltons, preferably at least about 6,000 daltons, and more preferably at least about 7,000 daltons, as determined by gel permeation chromatography (GPC), using tetrahydrofuran as solvent at 300° C. at a flow rate of 1.0 ml/min and an injection volume of 100 µl, and using a polystyrene standard and a GPC PRO 3.13 IBM AT module. This mercapto-terminated oligomer component comprises from about 5 to about 50 percent by weight of the composition based on the total weight of all ingredients. Preferably, this ingredient comprises from about 5 to about 40 percent, and more preferably from about 10 to about 40 percent by weight of the composition, based on total weight of the uncured coating composition.

If less than about 5 percent by weight of this component is used, the extractable content of the cured coating layer may be too high; if more than 50 percent is used, modulus is too low and a coating which is too soft may result.

The mercapto-terminated urethane oligomer (1) is typically the reaction product of (i) a polyol; (ii) a polyisocyanate, and (iii) an endcapping monomer capable of providing at least one mercapto terminus.

The polyol (i) may be, inter alia, a polyether polyol, a hydrocarbon polyol, a polycarbonate polyol, a polyisocyanate polyol, and mixtures of these. The polyether polyol is typically based on a straight chain, branched or cyclic alkylene oxide of about one to about twelve carbon atoms. Polyether diols and triols are preferred because they confer good solvent resistance and are relatively inexpensive. Such polyether polyols include but are not limited to polytetramethylene polyol, polymethylene oxide, polyethylene oxide, polypropylene oxide, polybutylene oxide, isomers thereof, and mixtures thereof. A particularly preferred polyether polyol comprises at least some units of polytetramethylene oxide and/or polypropylene oxide. Not suitable are polyester polyols because they are hydrolytically unstable. The polyol portion of the oligomer should have a molecular weight sufficiently high as to result in a number average molecular weight for the oligomer, as determined by GPC (gel permeation chromatography) , as determined above, of at least about 4,000 daltons, preferably at least about 6,000 daltons, and more preferably at least about 7,000 daltons. Such high molecular weight is essential to achieve the desirably low extractables values of the invention.

The polyol portion (i) is reacted with a polyisocyanate, preferably aliphatic, containing from about 4 to 20 carbon atoms. Aliphatic polyisocyanates are preferred because oligomers based on aromatic polyisocyanates effect yellowing in the cured coating. Suitable saturated polyisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega,omega'-dipropylether diisocyanate; 1,4-cyclohexyl diisocyanate; 1,3-cyclohexyl diisocyanate; trimethylhexamethylene diisocyanate; 1,3-bis(isocyanatomethyl)cyclohexane; 1,4-diisocyanatobutane; biuret of hexamethylene diisocyanate; norbornane diisocyanatomethyl 2,5(6)-bis(isocyanatomethyl)bicyclo [2,2,1] heptane; and mixtures thereof. Isophorone diisocyanate is the preferred aliphatic polyisocyanate. Suitable (though less preferred) aromatic polyisocyanates include toluene diisocyanate; diphenylmethylene diisocyanate; tetramethyl xylylene diisocyanate; 1,3-bis(isocyanatomethyl)benzene; p,m-phenylene diisocyanate; 4,4'-diphenylmethane diisocyanate; dianisidine diisocyanate (i.e., 4,4'-diisocyanato-3,3'-dimethoxy-1,1'-biphenyl diisocyanate); tolidine diisocyanate (i.e., 4,4'-diisocyanato-3,3'-dimethoxy-1,1'-biphenyl diisocyanate); and mixtures thereof. Of the aromatic polyisocyanates, toluene diisocyanate is preferred.

The reaction rate between the polyol and the polyisocyanate may be increased, e.g., by use of a catalyst in an amount of 100 to 200 ppm. Suitable catalysts include dibutyl tin dilaurate, dibutyl tin oxide, dibutyl tin di-2-hexoate, stannous oleate, stannous octoate, lead octane, ferrous acetoacetate, and amines such as triethylamine, diethylmethylamine, triethylenediamine, dimethylethylamine, morpholine, N-ethyl morpholine, piperazine, N,N-dimethyl benzylamine, N,N-dimethyl laurylamine, and mixtures thereof. A preferred catalyst is dibutyl tin dilaurate.

The endcapping monomer (iii) is a hydroxyl-terminated aliphatic monomercaptan or an aliphatic dimercaptan. Suitable such monomercaptan monomers include hydroxyethyl mercaptan and hydroxypropylmercaptan. Suitable dimercaptans include dimercaptoethane or dimercaptopropane. The molar ratio of polyol, polyisocyanate and endcapping monomer is preferably approximately 1:2:2, in the case of diol, or approximately 1:3:3, in the case of triol, yielding an oligomer having at each of its termini a mercaptan (thiol) group. Again, the entire oligomer has a number average molecular weight (Mn) as determined by gel permeation chromatography (GPC), per the method described above, of at least about 3,000 daltons, preferably at least about 6,000 daltons, and more preferably at least about 7,000 daltons.

Suitable commercially available mercapto-terminated oligomers include PERMAPOL® P2-805, PERMAPOL® P2-850, PERMAPOL® P2-935, and PERMAPOL® P2-985 all from Courtaulds Aerospace (formerly PRC), Burbank, Calif. PERMAPOL® P2-935 is the most preferred of this group. These oligomers are the reaction products of a polyether polyol, toluene diisocyanate and alkylene dithiol. Properties of these monomers are summarized below:

| PROPERTY | PERMAPOL ® P2 OLIGOMER/POLYMER | | | |
|---|---|---|---|---|
| | P2-805 | P2-850 | P2-935 | P2-985 |
| Appearance | Light straw color, viscous liquid | | | |
| Sulfur content, % | 2.5–3.0 | 2.5–3.0 | 1.0–2.0 | 2.0–2.5 |
| Number Average Molecular weight (GPC) | 8000 | 8000 | 9000 | 7400 |
| Equivalent Weight | 2100 | 2100 | 3700 | 3200 |
| Viscosity, poise 25° C. | 2000 | 1400 | 1000 | 2800 |
| Acidity, pH (H20 ext.) | 6.5 | 6.5 | 6.5 | 6.5 |
| Non-volatile content, % | 99 | 96 | 99 | 99 |
| Flash Point, PMCC, °F. | 309 | 124 | 309 | 309 |
| Moisture content, % | 0.1 | | | |
| Specific gravity, 25° C. | 1.04 | | | |
| Functionality | 3.81 | 3.81 | 2.43 | 2.31 |

(2) The (Meth)acrylate-Terminated Urethane Oligomer

The mercapto-terminated urethane oligomer is used in combination with one or more acrylate- or methacrylate-terminated oligomers. These acrylate- or methacrylate-terminated oligomers are capable of homopolymerization, but in this invention, are at least partially coreacted with the mercapto-terminated oligomers, above, to form the primary coating layer of the invention.

More specifically, this acrylate- or methacrylate-terminated ingredient is a wholly aliphatic urethane acrylate or methacrylate oligomer. Preferably, it is based on an aliphatic polyether polyol, which is reacted with an aliphatic polyisocyanate and either acrylated or methacrylated. Alternatively, it may be based on any backbone which does not adversely affect the cured coating. Other suitable examples of backbones include hydrocarbon polyols, polycarbonate polyols, polyisocyanate polyols, and mixtures of these. However, polyether polyol backbones are preferred, because, in general, they have good solvent resistance and are relatively inexpensive.

This component is chosen to confer good thermal and hydrolytic properties on the cured coating, and to be somewhat non-yellowing.

The urethane acrylate or methacrylate oligomer comprises from about 10 percent to about 80 percent by weight of the uncured primary coating material (composition), based on the total weight of the composition (all ingredients present, required and optional). Preferably, this component comprises from about 15 percent to about 70 percent, and more preferably about 20 percent to about 60 percent by weight of the composition based upon the total weight of all ingredients. If less than about 10 percent by weight of this component is used, flexibility, elongation to break and overall toughness will suffer. If more than about 80 percent by weight is used, the viscosity of the composition may be undesirably high and thus make application of the liquid composition difficult unless special provisions, such as heating the application die, are made.

The acrylate- or methacrylate-terminated urethane oligomer utilized in the present invention is the reaction product of (i) an aliphatic polyol; (ii) an aliphatic polyisocyanate; and (iii) an endcapping monomer capable of supplying a reactive terminus, either acrylate or methacrylate.

The polyol (i) may be an aliphatic polyol which does not adversely affect the properties of the composition when cured. Examples again include polyether polyols; hydrocarbon polyols; polycarbonate polyols; polyisocyanate polyols; and mixtures thereof. Polyols which should be limited or preferably excluded include polyester or epoxy backbones.

The oligomeric component may contain very small amounts of urethane acrylates based on polyesters, but preferably contains only the above kinds of oligomers, for optimal long term stability.

A representative polyether polyol is based on a straight chain, cyclic, or branched alkylene oxide of from one to about twelve carbon atoms. The polyether polyol may be prepared by any method known in the art. Preferably, it has a number average molecular weight ($M_n$), as determined in this case by vapor pressure osmometry (VPO), per ASTM D-3592, sufficient to give the entire oligomer based on it a molecular weight of not more than about 6,000 daltons, preferably not more than about 5,000 daltons, and more preferably not more than about 4,000 daltons. Such polyether polyols include but are not limited to polytetramethylene polyol, polymethylene oxide, polyethylene oxide, polypropylene oxide, polybutylene oxide, isomers thereof, and mixtures thereof.

Representative hydrocarbon polyols which may be used include but are not limited to those based on a linear or branched hydrocarbon polymer of from 600 to 4,000 molecular weight such as fully or partially hydrogenated 1,2-polybutadiene; 1,2-polybutadiene hydrogenated to an iodine number of from 9 to 21; and fully or partially hydrogenated polyisobutylene. Unsaturated hydrocarbon polyols are not desirable because the oligomers made from them, when cured, are susceptible to oxidation.

Representative polycarbonate polyols include but are not limited to the reaction products of dialkyl carbonate with an alkylene diol, optionally copolymerized with alkylene ether diols.

The polyisocyanate component (ii) is non-aromatic. oligomers based on aromatic polyisocyanates effect yellowing in the cured coating. Non-aromatic polyisocyanates of from 4 to 20 carbon atoms may be employed. Suitable saturated aliphatic polyisocyanates include but are not limited to isophorone diisocyanate; dicyclohexylmethane-4, 4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-diisocyanate; 1,9-nonamethylene diisocyanate; 1,10-decamethylene dissocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and mixtures thereof. Very small amounts of aromatic polyisocyanates may be used; however, long term stability on aging may suffer somewhat.

The reaction rate between the hydroxyl-terminated polyol and the diisocyanate may be increased by use of a catalyst in the amount of 100 to 200 ppm. Suitable catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine,triethylenediamine, dimethylethylamine, morpholine, N-ethyl morpholine, piperazine, N,N-dimethyl benzylamine, N,N-dimethyl laurylamine, and mixtures thereof.

The endcapping monomer (iii) may be one which is capable of providing at least one reactive terminus and which preferably provides acrylate or methacrylate termini. Suitable hydroxyl-terminated compounds which may be used as the endcapping monomers include but are not limited to hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and so forth.

A particularly preferred endcapping monomer is hydroxyethyl acrylate or hydroxyethyl methacrylate.

The molar ratio of the polyol, diisocyanate and endcapping monomer is preferably approximately 1:2:2.

Some commercially available oligomers which are suitable for the (meth)acrylated oligomer component of this invention include but are not limited to the following:

1. Echo Resins ALU-350 series resins, i.e., 350, 351, 352, 353 and 354, from Echo Resins and Laboratory, Versailles, Mo., all polytetramethylene polyol-based acrylated aliphatic urethane oligomers of increasing molecular weight and viscosity and decreasing modulus with increasing number in the series. Certain physical properties for this series of resins are summarized below:

|  | ALU-350 | ALU-351 | ALU-352 | ALU-353 | ALU-354 |
|---|---|---|---|---|---|
| Density @ 20° C. (g/cm$^3$) | 1.052 | 1.048 | 1.027 | 1.019 | 1.019 |
| (lbs/gal) | 8.76 | 8.73 | 8.55 | 8.49 | 8.49 |
| Refractive Index | 1.496 | 1.492 | 1.478 | 1.468 | 1.460 |
| Viscosity @ 78° F. (cps) | 320,000 | 120,000 | wax | wax | wax |
| @ 140° F. (cps) | 7,300 | 5,400 | 8,900 | 21,750 | 30,000–40,000 |
| Color, Gardner | <1 | <1 | <1 | <1 | <2 |
| Functionality | 2 | 2 | 2 | 2 | 2 |
| Percent Shrinkage, Cured | 3.6 | 2.8 | 1.7 | 1.3 | 1.1 |
| Number Average Molecular Weight (VPO) | 1,390 | 1,410 | 2,300 | 3,550 | 4,880 |

For these oligomers, number average molecular weight was determined by vapor pressure osmometry (VPO) using a Knauer VPO, calibrated with benzil, tetracosane and polystyrene standards, using toluene as solvent, for 3 minutes at 40° C., zero balance of 9 and range of 8, using a Universal probe.

In general, the lower molecular weight members of the series are preferred because they are less waxy and easier to work with, and because the compositions including them swell less when contacted with solvents which they may encounter.

The methacrylate equivalents of these oligomers are equally suitable.

2. PURELAST® aliphatic urethane acrylate oligomers based on polyether backbones, available from Polymer Systems Corporation, Orlando, Fla. Suitable PURELAST® oligomers include 566, 566A, 569, 569A, 586, 586A, 590, 590A, 595 and 595A. This series of oligomers increases in modulus with increasing number in the series. These oligomers are either difunctional (no suffix) or monofunctional ("A" suffix). All of these oligomers are sold neat.

Methacrylate analogs of these oligomers are suitable as well.

3. SARTOMER CN 980 and 981, both polyether-backboned aliphatic urethane acrylates, also from Sartomer Company, Exton, Pa.

4. BR-372, BR-543, BR-571, BR-582, all polyether-backboned aliphatic urethane acrylates, from Bomar Specialties, Winsted, Conn.

5. EBECRYL® 8800, EBECRYLO 270, and EBECRYL® 4826 oligomers, all from UCB Chemicals Corporation, Smyrna, Ga., all aliphatic urethane diacrylate oligomers based on polyethers.

EBECRYL® 8800 oligomer is diluted 10% with ethoxyethoxyethyl acrylate; has a viscosity at 65° C. of 8,000–18,000 cps and a Gardner Color Index of 2 max. Its density is 8.75 pounds per gallon; its theoretical molecular weight is 1,700. When cured it has a tensile strength of 3,150 psi; a tensile elongation of 83%, and a glass transition temperature of 48° C.

EBECRYL® 270 oligomer, previously sold as EBECRYL® 4826 oligomer, contains no diluent monomer; has a viscosity of 2,500–3,500 cps at 60° C. and a Gardner Color Index of 2 max. Its density is 8.91 pounds per gallon; its theoretical functionality is 2 and its theoretical molecular weight is 1,500. When cured it has a tensile strength of 1,200 psi, a tensile elongation of 87% and a glass transition temperature of –27° C.

Methacrylate equivalents of these oligomers may also be used.

6. UVITHANE® ZL-1178 oligomer from Morton Thiokol, Inc., Morton Chemical Division, Princeton, N.J., polyether based aliphatic urethane acrylate. This oligomer has a viscosity of 55–75 poises at 120° F. and 700–800 poises at 78° F. and, when cured neat, has a tensile strength of 325 psi and an ultimate elongation of 45%.

The methacrylate analog of this monomer may be used as well.

7. EBECRYL® 4842, which is a silicone-modified polyether-based aliphatic urethane acrylate, sold neat, and EBECRYL® 19–6264, which is not silicone-modified, but which is a polyether-based aliphatic urethane acrylate and which contains about 15% by weight of 1,6-hexanediol diacrylate as a reactive solvent, both from UCB Chemicals Corporation, Smyrna, Ga.

8. Hydrocarbon polyol-based aliphatic urethane acrylate oligomers such as are disclosed in U.S. Pat. No. 5,146,531, issued to Applicant. The content of that patent is expressly incorporated herein by reference. These oligomers are based on a linear or branched hydrocarbon polymer of from 600 to 4,000 molecular weight such as fully or partially hydrogenated 1,2-polybutadiene; 1,2-polybutadiene hydrogenated to an iodine number of from 9 to 21; and fully or partially hydrogenated polyisobutylene.

9. Furthermore, any aliphatic urethane acrylate or methacrylate oligomer of the type exemplified above is believed to be suitable so long as the desirable properties of the claimed composition are not adversely effected.

The cured primary coating of this invention has a water absorption value of less than about 5% by weight, and preferably less than about 3%. Furthermore, the cured material should swell less than 40% in length, and, in some embodiments, less than about 30% in length, when soaked in gasoline for about 4 hours at room temperature.

(3) The Monomer Diluent

The monomer diluent component which is reacted with the above-described oligomer in preparing the primary coating layer of the invention is selected to be one that is compatible with the oligomers above. It should be reactive with both of the above-described oligomers, and preferably has one or more acrylate or methacrylate moieties per monomer. The monomer diluent is capable of lowering the Tg (glass transition temperature) of the cured composition including it, and of lowering the viscosity of the uncured (liquid) composition to within the range of about 1,000 to about 10,000 cps (centipoises) at 250° C., preferably about 4,000 to about 8,000 cps, as measured by a Brookfield viscometer, Model LVT, spindle speed #34, at 25° C. If a viscosity higher than about 10,000 cps results, the liquid (uncured) composition including it may still be useful if certain processing modifications are effected (e.g., heating the dies through which the liquid coating composition is applied).

The monomer diluent comprises about 10 to about 75 percent, preferably about 15 to about 70 percent, and more preferably about 20 to about 65 percent by weight of the uncured (liquid) composition, based on the total weight of the composition (all ingredients). If less than about 10 percent of the monomer is present, viscosity may, again, be too high; conversely, if more than 75 percent is present, viscosity would be too low.

Suitable examples of monomer diluents include, but are not limited to, aromatic-containing monomers such as phenoxyalkyl acrylates or methacrylates (e.g., phenoxyethyl (meth)acrylate); phenoxyalkyl alkoxylate acrylates or methacrylates (e.g., phenoxyethyl ethoxylate (meth)acrylate or phenoxyethyl propoxylate(meth)acrylate); or one of any other such monomer diluents known to adjust the refractive index of a composition including it. Combinations including one or more of these are suitable as well. Such monomer diluents belonging to the later category are disclosed and described in U.S. Pat. No. 5,146,531 of Applicant herein incorporated by reference and may, for example, contain (1) an aromatic moiety; (2) a moiety providing a reactive (e.g., acrylic or methacrylic) group; and (3) a hydrocarbon moiety.

Samples of aromatic monomer diluents additionally containing hydrocarbon character and a vinyl group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures of these.

Such monomers are, for example, available from Toagasei Chemical Industry Company, Ltd., Tokyo, Japan under the trade names ARONIX® M111, M113, M114 and M117, and from Henkel Corporation, Ambler, Pa., under the trade name PHOTOMER® 4003.

Other suitable monomer diluents additionally include hydrocarbon alkyl acrylates or methacrylates which are either straight chain or branched, and may contain 8 to 18 carbon atoms in the alkyl moiety such as hexyl acrylate; hexyl methacrylate; ethylhexyl acrylate; ethylhexyl methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; $C_{14}$–$C_{15}$ hydrocarbon diol diacrylates; $C_{14}$–$C_{15}$ hydrocarbon diol dimethacrylates; and mixtures of the above. Of these, cetyl, lauryl and stearyl acrylates or methacrylates are most desired.

Also suitable are cyclic monomers such as isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; tetrahydrofurfuryl acrylate; tetrahydrofurfuryl methacrylate; and mixtures thereof.

Monomers which are unsuitable include hydrophilic ones such as n-vinyl pyrrolidone and n-vinyl formamide. N-vinyl pyrrolidone, which has in the past been widely used in optical fiber coating applications, is particularly undesirable because it is hydrophilic and, on long term water soaking, confers very poor water resistance. Moreover, it has been found recently to be carcinogenic. Thus, the composition should be substantially free of these monomers.

Preferred monomers include the refractive-index modifying type monomers as disclosed herein, alone or in combination with an alkyl (meth)acrylate such as lauryl acrylate.

Other Ingredients (4) Adhesion Promoter

Also included in the composition which makes up the primary coating layer may be, in some embodiments, an adhesion promoter. Adhesion becomes a particularly pertinent problem in high humidity and high temperature environments, where delamination is more of a risk. For uses protected from such environments, an adhesion promoter may be required.

It is known in the art to use either acid-functional materials or organofunctional silanes to promote adhesion of resins to glass. While acid-functional materials are operative herein, organofunctional silanes are preferred. Acid-functional materials are less preferred, however, because of their possible corrosivity towards the materials, and their tendency to lose their adhesion properties on exposure to moisture. (In general, acid-functional materials should be avoided in the compositions of the invention.) Silanes tend to be much more suitable in terms of these factors and, therefore, are the adhesion promoters of choice. Additionally, it is useful to have an adhesion promoter having a functionality which binds in with the system during cure, again to minimize the quantities of unbound volatiles. Various suitable organofunctional silanes include but are not limited to acrylate-functional silanes; amino-functional silanes; mercapto-functional silanes; methacrylate-functional silanes; acrylamido-functional silanes; allyl-functional silanes; and vinyl-functional silanes. The adhesion promoters preferably are methoxy- or ethoxy-substituted as well. Preferred organofunctional silanes include but are not limited to mercaptoalkyl trialkoxy silane, (meth)acryloxyalkyl trialkoxy silane, aminoalkyl trialkoxy silane, mixtures thereof, and the like. Methacrylated silanes are desirable, inasmuch as they bind in well with the cured system, but tend to slow the cure speed of the system down. The mercapto-functional adhesion promoters also chemically bind in during cure, but do not appreciably slow down the cure speed of the system.

Some preferred organofunctional silanes that enhance adhesion in humid conditions include 3-acryloxypropyltrimethoxy silane, vinyl-tris(2-methoxyethoxysilane), 3-methacryloxypropyltrimethoxy silane, 3-aminopropyltriethoxy silane, 3-mercaptopropyl trimethoxy silane and 3-mercaptopropyl(gamma-mercaptopropyl)triethoxy silane, and mixtures thereof. A particularly preferred adhesion promoter is 3-acryloxypropyltrimethoxy silane.

The silane component should be incorporated into the composition which is to be cured to form primary coating layer in a small but effective amount to enhance the adhesion of the composition to the surface of the substrate. The silane component comprises from about 0.1 percent to about 3.0 percent by weight of the composition, based on total weight of all ingredients. Preferably, the silane comprises from about 0.2 percent to about 2.0 percent, and more preferably from about 0.3 percent to about 1.0 percent, based on the total weight of the composition.

(5) The Photoinitiator

Another component of the composition which makes up the primary coating layer may be a photoinitiator. The necessity for this component depends on the envisioned mode of cure of the composition: if it is to be ultraviolet cured, a photoinitiator is needed; if it is to be cured by an electron beam, the material may comprise substantially no photoinitiator.

In the ultraviolet cure embodiment, the photoinitiator, when used in a small but effective amount to promote radiation cure, must provide reasonable cure speed without causing premature gelation of the composition. Further, it must not interfere with the optical clarity of the cured coating. Still further, the photoinitiator must itself be thermally stable, non-yellowing, and efficient.

Suitable photoinitiators include, but are not limited to, the following: hydroxycyclohexylphenyl ketone; hydroxymethyl-phenylpropanone;dimethoxyphenylacetophenone; 2-methyl-1-[4-methyl (thio)phenyl]-2-morpholino-propanone-1;1-(4-isopropylphenyl)-2-hydroxy-2-methylpropan-1-one;1-(4-dodecylphenyl)-2-hydroxy-2-methylpropan-1-one; 4-(2-hydroxyethoxy)phenyl-(2-hydroxy-2-propyl)ketone; diethyoxyacetophenone; 2,2-di-sec-butoxyacetophenone; diethoxy-phenyl acetophenone; and mixtures of these.

A preferred class of photoinitiators are the triacylphospine oxides, such as trimethylbenzoyldiphenylphosphine oxide (available from BASF Corp., Chemicals Division, Charlotte, N.C. as LUCIRIN TPO) trimethylbenzoylethoxyphenylphosphine oxide (available from BASF as LUCIRIN 8893); bis-(2,6-dimethoxybenzoyl)-2,4,4-trimethylpentyl phosphine oxide (available from Ciba-Geigy Corp., Ardseley, N.Y.); and mixtures thereof. The BASF phosphine oxides marketed as LUCIRIN TPO and LUCIRIN 8893, alone or, particularly, in combination, are preferred.

The photoinitiator, when used, preferably comprises from about 0.5 percent to about 10.00 percent by weight of the uncured composition, based upon the weight of the total composition. Preferably, the amount of photoinitiator is from about 1.0 percent to about 6.0 percent. The photoinitiator should be used at a level such that a cure speed, as measured in a dose versus modulus curve, of less than 0.7 J/cm$^2$, and preferably less than 0.5 J/cm$^2$, is obtained.

(6) Stabilizer

To improve shelf life (storage stability) of the uncured primary coating composition, as well as to increase thermal and oxidative stability of the cured primary coating layer, one or more stabilizers may be included in the composition. Examples of suitable stabilizers include tertiary amines such as diethylethanolamine and trihexylamine, hindered amines, organic phosphites, hindered phenols, mixture thereof, and the like. Some particular examples of antioxidants which can be used include octadecyl-3-(3',5,'-di-tert-butyl-4'-hydroxyphenyl)propionate, thiodiethylene bis(3,5-di-tert-butyl-4-hydroxy)hydrocinnamate, and tetrakis [methylene (3,5-di-tert-butyl-4-hydroxyhydrocinnamate)] methane. Additionally, certain silanes in small quantities, e.g., as low as 0.0001 percent to 0.1 percent by weight, may be used as stabilizers. An example of suitable such silane is 3-aminopropyl trimethoxy silane.

When a stabilizer is used, it may be incorporated in an amount from about 0.0001 percent to about 3.0 percent, based on the weight of the composition. Preferably, it is included in the range from about 0.25 percent to about 2.0 percent by weight, and more preferably in the range from about 0.5 percent to about 1.5 percent by weight, based on the total weight of all of the ingredients. Desirable properties of a stabilizer include (1) non-migration (probably enhanced by low polarity) and (2) basicity (to allow it to help in neutralizing residual acid which might prematurely initiate polymerization). Preferred stabilizers are thiodiethylene bis (3,5-di-tert-butyl-4-hydroxy)hydrocinnamate and 3-aminopropyl trimethoxysilane.

The primary coating composition which makes up the primary coating layer of this invention may either be top-coated with a secondary coating as known in the art, or may, in some cases, if tailored to be suitable therefor, be a monocoat wherein only this primary coating is required. A suitable secondary optical fiber coating, when used, optimally possess good thermal, oxidative and hydrolytic stability; hardness; high modulus; high glass transition temperature; and high refractive index.

An optional secondary coating may be applied atop the primary coatings of the invention. Suitable secondary coatings are those which are known in the art, including but not limited to those disclosed in Applicant's U.S. Pat. No. 5,352,712, issued Oct. 4, 1994 (expressly incorporated herein by reference).

Such secondary coating may, for example, comprise the reaction product of from about 10 percent to about 90 percent by weight of an aliphatic urethane oligomer based on a polyester and/or polyether and containing a reactive terminus; from about 20 percent to about 60 percent by weight of a hydrocarbonaceous viscosity-adjusting component capable of reacting with the reactive terminus of the oligomer; and optionally, from about 0.05 percent to about 10.0 percent by weight of a photoinitiator.

One preferred secondary coating may comprise the reaction product of from about 40 percent to about 80 percent by weight of a mixture of aliphatic urethane acrylate oligomers based on polyether backbones; from about 25 percent to about 50 percent by weight of a mixture of isobornyl acrylate and hexanediol diacrylate; and from about 2.0 percent to about 7.0 percent by weight of hydroxycyclohexylphenyl ketone photoinitiator.

Preparation of a Coated Optical Fiber

The invention also relates to a process for preparing a coated optical fiber having a reduced content of extractable and volatile material. The process comprises (1) applying to an optical glass fiber a primary coating composition layer comprising a mercapto-terminated urethane oligomer of number average molecular weight of at least 3,000 daltons, e.g., a composition comprising the following ingredients:

(1) from about 5 to about 50 percent by weight of a mercapto-terminated urethane oligomer of number average molecular weight (by GPC) of at least about 3,000 daltons;

(2) from about 10 to about 80 percent by weight of one or more acrylate- or methacrylate-terminated urethane oligomers;

(3) from about 10 to about 75 percent by weight of one or more monomer diluents;

(4) from about 0 to about 3 percent by weight of an organofunctional silane adhesion promoter which binds in with the primary coating composition during cure; and (5) from about 0 to about 10 percent by weight of a photoinitiator all of said percentages being percentages by weight based on the weight of all ingredients, and (2) radiation-curing said coating in situ.

In one embodiment, the process comprises applying only the primary coating composition of the invention to the optical fiber and radiation-curing the coating in situ.

In an alternative embodiment, a secondary coating composition may be applied atop the primary coating composition of this invention, and the two coatings sequentially or simultaneously radiation cured.

The primary and/or secondary coatings may be applied and cured by any method known in the art. A preferred method, whereby two coatings are applied wet-on-wet, is disclosed in U.S. Pat. No. 4,474,830 to C. Taylor of AT&T Bell Laboratories. The coating or coatings may then be cured in situ, preferably by ultraviolet irradiation, to obtain a cured polymeric coating. Alternatively, the primary coating may be applied and cured, after which the secondary coating may be applied and cured.

The Primary Coating Composition of the Invention

In a preferred embodiment, the invention relates to a primary coating composition for an optical fiber which comprises the cured reaction product of the following ingredients:

(1) from about 5 to about 50 percent by weight of a mercapto-terminated urethane oligomer of number average molecular weight as determined by gel permeation chromatography (GPC) of at least about 3,000 daltons;

(2) from about 10 to about 80 percent by weight of one or more acrylate- or methacrylate-terminated urethane oligomers;

(3) from about 10 to about 75 percent by weight of one or more monomer diluents;

(4) from about 0 to about 3.0 percent by weight of an organofunctional silane adhesion promoter which binds in with the primary coating composition during cure; and (5) from about 0 to about 10.0 percent by weight of a photoinitiator all of said percentages being percentages by weight based on the weight of all ingredients.

EXAMPLES

The following Examples serve to further illustrate the invention. In these Examples and elsewhere throughout this application, all parts and percentages are by weight, on a dry solids basis, and all temperatures are in degrees centigrade unless expressly stated to be otherwise. In all of the Examples, cure doses were measured with an International Light IL 390 radiometer. Unless otherwise noted, throughout the Examples and the remainder of this application, "modulus" refers to 2.5% tensile modulus, at 25° C., measured using an Instron Model 1122 tensile tester, per ASTM-D882.

All percent extractables values reported herein were obtained by Soxhlet extraction as described below. A flask containing EM Science Omnisolv grade methyl ethyl ketone (MEK) which is equipped with a side tube is fitted with a preweighed 33 mm×30 mm Whatman single thickness cellulose extraction thimble containing a sample of cured film. Each thimble was filled with approximately five 3½'×5'×6 mil drawdowns. 180ml of methyl ethyl ketone (MEK), the extracting solvent, is gently boiled (i.e., at about 80° C.), such that the solvent vapor passes up the side tube and its condensate drops onto the film sample and slowly leaches out extractable material. The process is carried out for approximately 16 hours, after which time the sample is dried in air to a constant weight at 23±2 C. and 50±5% RH. The percent extractables value is determined as the difference in weight of the sample before and after the extraction and drying ×100.

All TGA (thermogravemetric analysis) volatiles values reported herein were obtained according to the following method. A sample of cured composition was conditioned at 23±2° C. and 50±5% relative humidity for at least 16 hours. TGA analysis was conducted using a Perkin Elmer TGS-2 thermogravemetric analyzer. The analysis was done under nitrogen at a flow rate of 50 cc/minute. The thermogravemetric analysis program was isothermal at 25° C. for a minute, heated at 35° C./minute to 200° C., then held isothermal at 200° C. for 40 minutes.

Number average molecular weights were determined either by gel permeation chromatography (GPC) or by vapor pressure osmometry (VPO), as indicated below, unless otherwise indicated. When determined by GPC, the measurement was made in THF solvent; at a flow rate of 1.0 ml/min and an injection volume of 100 µl, using a GPC PRO 3.13 IBM AT module. When determined by VPO it was performed using a Knauer VPO, calibrated with benzil, tetracosane and polystyrene standards, using toluene as solvent, for 3 minutes at 40° C., zero balance of 9 and range of 8, using a Universal probe.

As in the remainder of the application, parts by weight in the Examples refers to the total composition described in that Example, including all ingredients, whether required or optional. The optional ingredients are identified by an asterisk (*) in the Examples. It should be noted that, although the specification teaches that the photoinitiator is optional, it is required in the Examples, all of which employ ultraviolet cure. The other components may be essential for use, if the exemplified coating is to meet the rigorous requirements for a commercially acceptable coating for optical glass fiber.

EXAMPLE 1

A Composition Which, When Cured, Comprises About 7.43 Percent Extractables and Low Volatiles The following composition was made up:

| Ingredient | Percent by Weight |
|---|---|
| PERMAPOL ® P2-935 mercapto-terminated urethane oligomer, average mercapto functionality of 2.43, number average molecular weight (GPC) of about 9000 daltons, from Courtaulds Aerospace, Burbank, CA | 27.00 |
| ALU-351 polytetramethylene polyol-based acrylated aliphatic urethane oligomer of number average molecular weight (VPO) of about 1,410 daltons, from Echo Resins and Laboratories, Versailles, MO | 20.00 |
| PURELAST ® 590 aliphatic urethane diacrylate oligomer based on polyether backbone, from Polymer Systems Corporation, Orlando, FL | 6.00 |
| ARONIX ® M-111 polyethylene glycol nonylphenylether acrylate, from Toagasei Chemical Industry Company, Ltd., Tokyo, Japan | 43.04 |
| LUCIRIN 8893 trimethylbenzoyl-ethoxyphenyl-phosphine oxide photoinitiator from BASF, Corp., Charlote, NC | 1.05 |
| LUCIRIN TPO trimethylbenzoylki-phenylphosphine oxide photoinitiator, also from BASF, Corp. | 0.95 |
| IRGANOX ® 1035 thiodiethylene bis (3,5-di-tert-butyl-4-hydroxy) hydrocinnamate stabilizer, from Ciba-Geigy, Ardsley, NY* | 1.00 |
| AO 397 3-acryloxypropyl trimethoxysilane adhesion promoter, from United Chemical Technology, Bristol, PA* | 0.95 |
| A1110 3-aminopropyltrimethoxysilane stabilizer, from OSi Specialties, Inc., Danbury, CT* | 0.01 |

The above uncured composition had a viscosity of 8750 cps.

A 6 mil coating of this composition was applied to a flat glass sheet using a Conrad Hanovia Bird applicator and cured in air at 0.7 J/cm$^2$ using a 200 watts per inch medium pressure mercury vapor lamp. A tensile modulus for this coating of 214.5 psi was measured according to ASTM-D882. When subjected to Soxhlet extraction in the manner described above, a percent extractable value of 7.43 for the primary coating layer (average of two samples) was noted, as well as a TGA volatiles value of 1.75%, both of which are well within the parameters the invention.

EXAMPLE 2

Another Composition Yielding a Coating Exhibiting Low Extractables and Volatiles A composition similar to the one described in Example 1 but including more mercapto-functional oligomer and also including 10% by weight of lauryl acrylate was prepared as follows:

| Ingredient | Percent by weight |
| --- | --- |
| PERMAPOL® P2-935 mercapto-terminated urethane oligomer, as above | 35.49 |
| ALU-351 polytetramethylene polyol-based acrylated aliphatic urethane oligomer, of number average molecular weight (VPO) of about 1,410 daltons, from Echo Resins | 22.55 |
| PURELAST® 590 aliphatic urethane diacrylate oligomer based on polyether backbone, from Polymer Systems | 6.00 |
| ARONIX® M-111 polyethylene glycol nonylphenylether acrylate, from Toagasei | 22.00 |
| AGEFLEX® lauryl acrylate from CPS Chemical, Old Bridge, NJ | 10.00 |
| AO 397 3-acryloxypropyl trimeth-oxysilane adhesion promoter, from United Chemical Technology | 0.95 |
| LUCIRIN 8893 trimethylbenzoyl-ethoxyphenyl-phosphine oxide photoinitiator, from BASF Corp. | 1.05 |
| LUCIRIN TPO trimethylbenzoyldi-phenylphosphine oxide photoinitiator, from BASF Corp. | 0.95 |
| IRGANOX® 1035 thiodiethylene bis (3,5-di-tert-butyl-4-hydroxy) hydrocinnamate stabilizer, from Ciba Geigy Corp.* | 1.00 |
| A1110 3-aminopropyltrimethoxy-silane stabilizer from OSi Specialties, Inc.* | 0.01 |

The uncured composition had a viscosity, as measured using a Brookfield viscometer at the above-noted parameters, of about 9,000 cps.

When cured in the manner of Example 1, a tensile modulus, per ASTM-D882, of 207.4 psi was recorded, and a refractive index of 1.4797 was noted. When a sample was soaked in gasoline for four hours at room temperature it swelled 37.3% in length, which is considered acceptable solvent resistance.

When subjected to Soxhlet extraction, an average percent extractables value, based on two samples, of 7.74 was measured, as well as a TGA volatiles value of 1.80%, also well within the parameters of this invention.

COMPARATIVE EXAMPLE I

A Coating Having Acceptable Extractable and Volatile Contents, But Having Unacceptable Modulus Another coating, lacking a mercapto-functional urethane oligomer, and having acceptable extractables and volatiles content but a very unacceptable modulus value was made up as follows:

| Ingredient | Percent by weight |
| --- | --- |
| ALU-351 acrylated oligomer, from Echo Resins | 51.85 |
| PURELAST® 590 oligomer, from Polymer Systems | 6.35 |
| ARONIX® M-111, polyethylene glycol nonylphenylether acrylate, from Toagasei | 33.43 |
| IRGACURE® 184 cyclohexylphenyl ketone | 6.35 |

| Ingredient | Percent by weight |
| --- | --- |
| photoinitiator, from Ciba Geigy | |
| IRGANOX® 1035 thiodiethylene bis (3,5-di-tert-butyl-4-hydroxy) hydrocinnamate, from Ciba Geigy* | 1.06 |
| Y-11167 mercaptopropyltrimeth-oxysilane, from OSi Specialties, Inc.* | 0.42 |
| A-174 methacryloxypropyl trimethoxy silane, also from OSi* | 0.53 |
| A1110 3-aminopropyltrimethoxy-silane stabilizer, also from OSi* | 0.01 |

The composition, when cured, had an average MEK (Soxhlet) extractable value, based on two samples, of 9.85%. However, the cured composition's tensile modulus was 736.6 psi, and thus would be expected to result in an unacceptable coating susceptible to microbending.

EXAMPLE 3

A composition identical to that of Comparative Example 1 but additionally including the mercapto-functional urethane oligomer PERMAPOL® P2-935 of number average molecular weight (GPC) 9000 daltons in a 65:35 ratio (i.e., in a ratio of 65.00% of the Comparative Example 1 composition to 35.00% of P2-935) was made up. When cured, it has a tensile modulus of 337.5 psi, TGA volatiles of 4.43%, and average percent extractables value of 9.51.

COMPARATIVE EXAMPLE 2

A composition identical to Comparative Example 1 but additionally containing the mercapto-functional urethane oligomer PERMAPOL® P2-795, average mercapto functionality of 2, number average molecular weight (GPC) of 2300 daltons (also from Courtaulds Aerospace) in a 65:35 ratio (i.e., in a ratio of 65.00% of the composition of Comparative Example 1 to 35.00% of PERMAPOL® P2-795) was made up. When cured, it had a tensile modulus of 220.0 psi, percent extractables (average) of 18.4, and TGA volatiles of 5.1%. It is believed that the unacceptable extractables value results from using an oligomer of such low molecular weight.

EXAMPLE 4

A Lower Modulus Coating of High Viscosity

Another composition identical to that of Comparative Example 1 was made, but in this case, additionally including the PERMAPOL® P2-935 mercapto-functional urethane oligomer in a 50:50 weight ratio with the Comparative Example 1 composition (i.e., 50% weight percent of the Comparative Example I composition and 50% weight percent of P2-935). Though the viscosity of this composition was very high (it could not be measured with the Brookfield viscometer), when cured, the coating had a modulus of 219.4 psi, TGA volatiles of 3.65, and average percent extractables value of 9.82, all of which were acceptable values.

EXAMPLE 5

A Coating Based on a Very High Molecular Weight Mercapto Oligomer

A dimercapto-terminated oligomer "X" was prepared as follows. A one liter reaction kettle with a four-necked lid was fitted with a mechanical stirrer, a stopper for additions and sampling, a thermocouple, an adapter for gas sparging, and an Allihn condenser was used. 50.82 grams of isophorone diisocyanate (eq. weight 111.0) and 435.12 grams of polytetramethylene oxide polymer (eq. weight 1425.67) were charged to the reactor. A nitrogen purge was begun and mixing started while applying heat to bring the reaction mass to 580° C. When the contents of the kettle reached 58° C., five drops of tin catalyst were added. The reaction temperature was controlled to 60° C. and allowed to proceed until the isocyanate content reached 1.32%. Approximately 14 grams of 3-mercapto-1-propanol(eq. weight 92.16) and five more drops of catalyst were added. The reaction was allowed to proceed until the isocyanate content, as determined by infrared spectroscopy, was essentially zero. The resultant oligomer was later determined by GPC (in THF solvent at 30° C., flow rate 1.0 ml/min; injection volume 100 µl; using a GPC PRO 3.13 IBM AT module) to have a number average molecular weight (Mn) of 27,500 daltons.

A low extractables coating composition was made up by mixing this oligomer with the following ingredients:

| Ingredient | Percent by weight |
| --- | --- |
| Dimercapto-terminated oligomer "X", number average molecular weight (by GPC) of 27,500, as described above | 14.00 |
| ALU-351 oligomer, from Echo Resins | 15.00 |
| PURELAST ® 590 oligomer, from Polymer Systems | 8.00 |
| ARONIX ® M-111 polyethylene glycol nonylphenylether acrylate, from Toagaesei | 44.04 |
| AGEFLEX ® lauryl acrylate, from CPS | 15.00 |
| LUCIRIN 8893 photoinitiator, from BASF Inc. | 2.00 |
| A0397 3-acryloxypropyltrimeth-oxysilane, from OSi Specialties Inc.* | 0.95 |
| IRGANOX ® 1035 thiodiethylene bis (3,5-di-tert-butyl-4-hydroxy hydrocinnamate stabilizer, from Ciba Geigy* | 1.00 |
| A1110 3-aminopropyltrimethoxy-silane stabilizer, from OSi Specialties Inc.* | 0.01 |

The resulting composition had an viscosity of 5290 cps, and, when cured, had a tensile modulus of 210.6 psi and 10.4% extractables when subjected to Soxhlet extraction.

EXAMPLE 6

A Coating with Higher, Though Still Acceptable, Extractables and Volatiles Content The following composition was made up, which employs a different mercapto-functional oligomer:

| Ingredient | Percent by weight |
| --- | --- |
| PERMAPOL ® P2-850 mercapto-terminated urethane oligomer, average mercapto functionality of 3.81, number average molecular weight (GPC) about 8000 daltons, from Courtaulds Aerospace | 17.70 |
| ALU-351 acrylated oligomer, from Echo Resins | 23.30 |
| PURELAST ® 590 oligomer, from Polymer Systems | 6.00 |
| ARONIX ® M-111, polyethylene glycol nonylphenylether acrylate monomer, from Toagasei | 45.09 |
| IRGACURE ® 184 cyclohexylphenyl ketone photoinitiator, from Ciba Geigy | 6.00 |
| IRGANOX ® 1035 thiodiethylene bis (3,5-di-tert-butyl-4-hydroxy) hydrocinnamate, from Ciba Geigy* | 1.00 |
| Y-11167 mercaptopropyltrimethoxy-silane, from OSi Specialties, Inc.* | 0.40 |

| Ingredient | Percent by weight |
| --- | --- |
| A-174 methacryloxypropyl trimethoxy silane, also from OSi* | 0.50 |
| A1110 3-aminopropyltrimethoxy-silane stabilizer, also from OSi* | 0.01 |

The uncured composition had a viscosity of 6900 cps. When cured, the coating's modulus was 214.0 psi; its average extractables (based on two samples) content was 14.52%; and its TGA volatiles content was 6.52%.

EXAMPLE 7

Another Coating Having a Higher, Though Still Acceptable, Extractable Content

Another dimercapto-terminated oligomer, "Y", was prepared as follows. A reaction kettle (fitted with a four-necked lid, a mechanical stirrer, a stopper, a thermocouple, an adapter and a condenser) was charged with 63.8 grams of isophorone diisocyanate and 410 grams of polytetramethylene polyol (number average molecular weight, as determined by the acetic anhydride method, of 2900 daltons) at 28° C. A nitrogen purge was begun and mixing was commenced. When the reaction mixture reached 33° C., three drops of a tin catalyst were added. The reaction was continued at about 50° C. until the free isocyanate content reached about 2.54%. At that temperature, about 26.5 grams of 3-mercapto-1-propanol were added, and the reaction allowed to proceed with periodic addition of further tin catalyst. When the free isocyanate content reached about 0.0, the reaction was complete. Subsequent analysis by GPC (in THF solvent at 30° C., flow rate 1.0 ml/min; injection volume of 100 µl; using a GPC PRO 3.13 IBM AT module) revealed a molecular weight (Mn) of about 8100 daltons.

This oligomer "Y" was combined with the following ingredients:

| Ingredient | Percent by weight |
| --- | --- |
| Oligomer "Y" described above, number average molecular weight (Mn) by GPC of about 8100 daltons | 17.50 |
| ALU-351 oligomer, from Echo Resins | 25.54 |
| PURELAST ® 590 oligomer, from Polymer System | 8.00 |
| ARONIX ® M-111 polyethylene glycol nonylphenylether acrylate monomer, from Toagasei | 30.00 |
| AGEFLEX ® lauryl acrylate, from CPS Chemical | 15.00 |
| LUCIRIN 8893 photoinitiator, from BASF | 2.00 |
| AO 397 3-acryloxypropyltri-methoxysilane adhesion promoter, from OSi* | 0.95 |
| A 1110 3-aminopropyltrimethoxy-silane stabilizer, from OSi* | 0.01 |
| IRGANOX 1035 stabilizer, from Ciba Geigy* | 1.00 |

The uncured composition had a viscosity of about 5640 cps and cured to form a coating of 261.4 psi tensile modulus. When subjected to Soxhlet extraction, an average extractable value of 13.35% was measured.

EXAMPLE 8

A Coating Based on a Lower Molecular Weight Mercapto Oligomer

Another mercapto-terminated oligomer "Z" was prepared as follows. A reaction vessel as described in the previous synthetic examples was used. To it were added 304.8 grams of DuPont PTMO 1000 polytetramethyl oxide polyether polyol and 138 grams of isophorone diisocyanate. A nitrogen purge was begun and mixing effected while heating the reaction mixture to 63° C., at which time 2 drops of tin catalyst were added. The reaction was allowed to proceed until the isocyanate content reached 5.89%. 57.3 grams of 3-mercapto-1-propanol and 2 drops of catalyst were subsequently added. The temperature was raised to 65°–72 C. and the reaction was allowed to continue for another approximately 1.5 hours, after which time the isocyanate content was measured to be 0.25%, and another 5 drops of catalyst were added. After another two hours of reaction, isocyanate content was measured, by IR scan, to be 0.0%. The oligomer which resulted was later determined by GPC to have a number average molecular weight (Mn) of 3,300 daltons.

A suitable low extractables composition was made up using the above oligomer as follows:

| Ingredient | Percent by weight |
| --- | --- |
| Oligomer "Z", number average molecular weight by GPC of 3,300 daltons | 15.00 |
| PURELAST ® 590 oligomer, from Polymer System | 8.00 |
| ALU-351 oligomer, from Echo Resins | 28.04 |
| ARONIX ® M-111 polyethylene glycol nonphenylether acrylate, from Toagasei | 30.00 |
| AGEFLEX ® lauryl acrylate, from CPS | 15.00 |
| LUCIRIN 8893 photoinitiator, from BASF | 2.00 |
| IRGANOX 1035 thiodiethylene bis(3,5-di-tert-butyl-4-hydroxy) hydrocinnamate stabilizer, from Ciba Geigy* | 1.00 |
| AO 397 3-acryloxypropyltri-methoxysilane, from OSi* | 0.95 |
| A 1110 3-aminopropyltrimethoxy-silane stabilizer, from OSi | 0.01 |

The resulting composition had a viscosity of 3150 cps, and, when cured, had a tensile modulus of 230.6 psi and 12.4% extractables (average of two values) when subjected to Soxhlet extraction.

Although the present invention has been described with reference to preferred embodiments, it will be understood that the invention is not limited to the details thereof. Various substitutions and modifications have been described in the course of the foregoing description, and others will be apparent to those of ordinary skill in the art. All such substitutions and modifications are intended to fall within the scope of the invention as described in the appended claims.

What is claimed is:

1. A coated optical fiber having a reduced content of extractable and volatile material, said coated optical fiber comprising (a) optical fiber; and (b) a primary coating layer comprising the radiation-cured reaction product of the following ingredients:

(1) from about 5 to about 40 percent by weight of a mercapto-terminated urethane oligomer of number average molecular weight as determined by gel permeation chromatography (GPC) of at least about 7,000 daltons;

(2) from about 15 to about 70 percent by weight of one or more acrylate- or methacrylate-terminated urethane oligomers which is the reaction product of (i) a polyether polyol; (ii) a non-aromatic polyisocyanate; and (iii) an endcapping monomer capable of providing an acrylate or methacrylate terminus;

(3) from about 15 to about 70 percent by weight of one or more monomer diluents selected from the group consisting of (i) alkyl acrylate and alkyl methacrylate monomers having 6 to 18 carbon atoms in the alkyl moiety;

(ii) monomers having (i) an aromatic moiety, (2) a moiety containing acrylic or methacrylic unsaturation, and (3) a hydrocarbon moiety; and (iii) mixtures thereof;

(4) from about 0 to about 3.0 percent by weight of an acrylate-functional silane adhesion promoter which binds in with the primary coating composition during cure; and (5) from about 0 to about 10.0 percent by weight of a triacylphosphine oxide photoinitiator, all of said percentages being percentages by weight based on the weight of all ingredients.

2. A coated optical fiber having a reduced content of extractable and volatile material, said coated optical fiber comprising (a) an optical fiber; and (b) a primary coating layer comprising the radiation-cured reaction product of a composition comprising a mercapto-terminated urethane oligomer of number average molecular weight as determined by gel permeation chromatography (GPC) of at least about 3,000 daltons.

3. The coated optical fiber of claim 2, wherein said mercapto-terminated urethane oligomer in (b) is dimercapto-terminated and comprises from about 5 to about 50 percent by weight of the composition.

4. The coated optical fiber of claim 2, wherein, when the radiation-cured primary coating layer (b) is subjected to Soxhlet extraction, a percent extractable value of less than about 15% results.

5. The coated optical fiber of claim 2, wherein, when the radiation-cured primary coating layer (b) is subjected to Soxhlet extraction, a percent extractable value of less than about 8% results.

6. The coated optical fiber of claim 2, wherein, when the radiation-cured primary coating layer (b) is subjected to thermogravimetric analysis (TGA), a percent volatile value of less than about 7% results.

7. The coated optical fiber of claim 2, wherein, when the radiation-cured primary coating layer (b) is subjected to thermogravimetric analysis (TGA), a percent volatile value of less than about 3% results.

8. The coated optical fiber of claim 2, wherein said number average molecular weight of the oligomer in (b) is at least about 6,000 daltons.

9. The coated optical fiber of claim 2, wherein said number average molecular weight of the oligomer in (b) is at least about 7,000 daltons.

10. The coated optical fiber of claim 2, wherein said primary coating layer (b) comprises the reaction product of, in addition of said mercapto-terminated urethane oligomer, from about 10 to about 80 percent by weight of one or more acrylate- or methacrylate-terminated urethane oligomers.

11. The coated optical fiber of claim 10, wherein the acrylate- or methacrylate-terminated urethane oligomer is a reaction product of (i) a polyether polyol; (ii) a non-aromatic polyisocyanate; and (iii) an endcapping monomer capable of providing an acrylate or methacrylate terminus.

12. The coated optical fiber of claim 10 wherein said primary coating layer (b) comprises the reaction product of, in addition of said mercapto-terminated urethane oligomer and acrylate or methacrylate-terminated oligomer, from about 10 to about 75 percent by weight of one or more monomer diluents selected from the group consisting of (i) alkyl acrylate and alkyl methacrylate monomers having 6 to 18 carbon atoms in the alkyl moiety;

(ii) monomers having (i) an aromatic moiety, (2) a moiety containing acrylic or methacrylic unsaturation, and (3) a hydrocarbon moiety; and
(iii) mixtures thereof.

13. The coated optical fiber of claim 12, wherein said monomer diluent is selected from hexyl acrylate; hexylmethacrylate; ethylhexyl acrylate; ethylhexylmethacrylate; isooctyl acrylate; isooctyl methacrylate; octyl acrylate; octyl methacrylate; decyl acrylate; decyl methacrylate; isodecyl acrylate, isodecyl methacrylate; lauryl acrylate; lauryl methacrylate; tridecyl acrylate; tridecyl methacrylate; palmitic acrylate; palmitic methacrylate; stearyl acrylate; stearyl methacrylate; $C_{14}$–$C_{15}$ hydrocarbon diol diacrylates; $C_{14}$–$C_{15}$ hydrocarbon diol dimethacrylates; phenoxyalkyl acrylate; phenoxyalkyl methacrylate; phenoxyalkyl alkoxylate acrylate; phenoxyalkyl alkoxylate methacrylate; isobornyl acrylate; isobornyl methacrylate, dicyclopentenylacrylate; dicyclopentenylmethacrylate; dicyclopentenyl ethoxylate acrylate; dicyclopentenyl ethoxylate methacrylate; tetrahydrofurfuryl acrylate; tetrahydrofurfuryl methacrylate; polyalkylene glycol nonylphenylether acrylates; polyalkylene glycol nonylphenylether methacrylates; and mixtures thereof.

14. The coated optical fiber of claim 12, wherein said monomer diluent is a mixture of
(i) alkyl acrylate and alkyl methacrylate monomers having 6 to 18 carbon atoms in the alkyl moiety; and
(ii) monomers having (i) an aromatic moiety, (2) a moiety containing acrylic or methacrylic unsaturation, and (3) a hydrocarbon moiety.

15. The coated optical fiber of claim 10 wherein said primary coating layer additionally comprises from about 0.1 to about 3.0 percent by weight of an organofunctional silane adhesion promoter which binds in with the primary coating during curing.

16. The coated optical fiber of claim 15, wherein said adhesion promoter is selected from acrylate-functional silanes; amino-functional silanes; mercapto-functional silanes; methacrylate-functional silanes; acrylamido-functional silanes; alkyl-functional silanes; vinyl-functional silanes; and mixtures thereof.

17. The coated optical fiber of claim 15, wherein said adhesion promoter is selected from 3-acryloxypropyltrimethoxy-silane, 3-aminopropyltriethoxysilane, 3-methacryloxypropyltrimethoxy silane, 3-mercaptopropyltrimethoxysilane and 3-mercaptopropyltriethoxy silane, and mixtures thereof.

18. The coated optical fiber of claim 15, wherein said adhesion promoter is 3-acryloxypropyltrimethoxysilane.

19. The coated optical fiber of claim 10 wherein said primary coating layer additionally comprises a photoinitiator.

20. The coated optical fiber of claim 19, wherein the photoinitiator comprises one or more triacyl phosphine oxides.

21. The coated optical fiber of claim 10 wherein said primary coating layer additionally comprises from about 0.0001 to about 3.0 percent by weight of a stabilizer selected from the group consisting of organic phosphates; silanes; hindered phenols; amines and mixtures thereof.

22. The coated optical fiber of claim 21, wherein said stabilizer is 3-aminopropyltrimethoxysilane.

23. The coated optical fiber of claim 21, wherein said stabilizer is thiodiethylene bis(3,5-di-tert-butyl-4-hydroxy) hydrocinnamate.

24. A coated optical fiber having a reduced content of extractable and volatile material, said coated optical fiber comprising (a) an optical fiber; and (b) a primary coating layer comprising the radiation-cured reaction product of the following ingredients:

(1) from about 5 to about 50 percent by weight of a mercapto-terminated urethane oligomer of number average molecular weight as determined by gel permeation chromatography (GPC) of at least about 3,000 daltons;
(2) from about 10 to about 80 percent by weight of one or more acrylate- or methacrylate-terminated urethane oligomers;
(3) from about 10 to about 75 percent by weight of one or more monomer diluents;
(4) from about 0 to about 3.0 percent by weight of an organofunctional silane adhesion promoter which binds in with the primary coating composition during cure; and
(5) from about 0 to about 10.0 percent by weight of a photoinitiator all of said percentages being percentages by weight based on the weight of all ingredients.

25. The coated optical fiber of claim 24, wherein, when the radiation-cured primary coating layer (b) is subjected to Soxhlet extraction, a percent extractable value of less than about 15% results.

26. The coated optical fiber of claim 24, wherein, when the radiation-cured primary coating layer (b) is subjected to Soxhlet extraction, a percent extractable value of less than about 8% results.

27. The coated optical fiber of claim 24, wherein, when the radiation-cured primary coating layer (b) is subjected to thermogravimetric analysis (TGA), a percent volatile value of less than about 78% results.

28. The coated optical fiber of claim 24, wherein, when the radiation-cured primary coating layer (b) is subjected to thermogravimetric analysis (TGA), a percent volatile value of less than about 3% results.

29. A primary coating composition for an optical fiber which comprises the following ingredients:
(1) from about 5 to about 50 percent by weight of a mercapto-terminated urethane oligomer of number average molecular weight as determined by gel permeation chromatography (GPC) of at least about 3,000 daltons;
(2) from about 10 to about 80 percent by weight of one or more acrylate- or methacrylate-terminated urethane oligomers;
(3) from about 20 to about 75 percent by weight of one or more monomer diluents,
(4) from about 0 to about 3.0 percent by weight of an organofunctional silane adhesion promoter which binds in with the primary coating composition during cure, and
(5) from about 0 to about 10.0 percent by weight of a photoinitiator all of said percentages being percentages by weight based on the weight of all ingredients.

30. A primary coating composition for an optical fiber which comprises a mercapto-terminated urethane oligomer of number average molecular weight as determined by gel permeation chromatography (GPC) of at least about 3,000 daltons.

31. A process for preparing a coated optical fiber comprising
(1) applying to an optical fiber a primary coating composition layer comprising a mixture of the following ingredients:
(i) from about 5 to about 50 percent by weight of a mercapto-terminated urethane oligomer of number average molecular weight as determined by gel permeation chromatography (GPC) of at least about 3,000 daltons;

(ii) from about 10 to about 80 percent by weight of one or more acrylate- or methacrylate-terminated urethane oligomers;

(iii) from about 10 to about 75 percent by weight of one or more monomer diluents;

(iv) from about 0 to about 3.0 percent by weight of an organofunctional silane adhesion promoter which binds in with the primary coating composition during cure; and (v) from about 0 to about 10.0 percent by weight of a photoinitiator, all of said percentages being percentages by weight based on the weight of all ingredients and (2) radiation-curing said coating in situ.

* * * * *